(12) United States Patent
Davis

(10) Patent No.: US 9,443,267 B1
(45) Date of Patent: Sep. 13, 2016

(54) SELF ORGANIZING ELECTRIC GRID WITH MOBILE PAYMENT SYSTEM

(75) Inventor: Benjamin M. Davis, San Francisco, CA (US)

(73) Assignee: Google Inc., Mountain View, CA (US)

( * ) Notice: Subject to any disclaimer, the term of this patent is extended or adjusted under 35 U.S.C. 154(b) by 941 days.

(21) Appl. No.: 13/302,607

(22) Filed: Nov. 22, 2011

(51) Int. Cl.
*G06Q 30/00* (2012.01)
*G06Q 40/00* (2012.01)

(52) U.S. Cl.
CPC ............ *G06Q 40/00* (2013.01); *G06Q 30/00* (2013.01)

(58) Field of Classification Search
CPC ...... G06Q 10/00; G06Q 20/00; G06Q 30/00; G06Q 40/00
USPC ........................................................ 705/3–44
See application file for complete search history.

(56) References Cited

U.S. PATENT DOCUMENTS

| | | | |
|---|---|---|---|
| 6,598,029 B1 * | 7/2003 | Johnson ................. | G06Q 10/04 376/215 |
| 7,362,232 B2 | 4/2008 | Holle et al. | |
| 7,840,493 B2 * | 11/2010 | Neri-Badillo ................... | 705/63 |
| 8,521,337 B1 * | 8/2013 | Johnson ................. | H02J 3/008 370/252 |
| 8,583,551 B2 * | 11/2013 | Littrell ................. | G06Q 20/102 705/35 |
| 2003/0216971 A1 * | 11/2003 | Sick ....................... | G01D 4/004 705/7.36 |
| 2004/0138981 A1 * | 7/2004 | Ehlers et al. ................... | 705/36 |
| 2007/0136120 A1 * | 6/2007 | Watanabe .............. | G06Q 10/04 705/7.25 |
| 2013/0274947 A1 * | 10/2013 | Miller ..................... | G06F 1/263 700/297 |

FOREIGN PATENT DOCUMENTS

EP    1962098 A1 *    8/2008

OTHER PUBLICATIONS

Guay, Justin, "Sierra Club India: A Radical Affordability Solution," Compass, published 2011, accessed at http://sierraclub.typepad.com/compass/2011/05/sierra-club-india-a-radical-affordability-solution-.html, accessed on Mar. 27, 2012, 3 pages.
Springwise, "In India, home solar energy on a pay-as-you-go plan," Springwise.com, published Nov. 11, 2011, accessed at http://www.springwise.com/eco_sustainability/in-india-home-solar-energy-pay-as-you-go-plan/, accessed on Mar. 27, 2012, 3 pages.

* cited by examiner

*Primary Examiner* — Frantzy Poinvil
(74) *Attorney, Agent, or Firm* — Lerner, David, Littenberg, Krumholz & Mentlik, LLP

(57) ABSTRACT

A system and a computer-implemented method for providing a prepaid amount of energy, are provided. The system includes a source node that receives a message authorizing a disbursement of the prepaid amount of energy at a receiver node. The payment for the prepaid amount of energy is made using a receiver node identifier associated with the receiver node that receives the discrete amount of energy. The source node receives input voltage from a power source for the duration that corresponds to the payment amount for energy. The input voltage provided by the power source is transformed into a micro-grid voltage that is distributed to the receiver node in a point-to-point wiring.

23 Claims, 11 Drawing Sheets

US 9,443,267 B1

SELF ORGANIZING ELECTRIC GRID WITH MOBILE PAYMENT SYSTEM

BACKGROUND

With a lack of power lines to carry energy in remote locations, one way to generate and spread energy is to invest in power sources, such as a diesel energy generator, a solar panel or a gasifier. Those power sources typically produce enough energy for a house or a business. However, the owner of the power source may have additional energy that he may want to distribute to neighbors or to distribute for public use to persons who cannot afford their own power source.

BRIEF SUMMARY

A system and a computer-implemented method for providing a prepaid amount of energy are provided. The system includes a source node that receives a message authorizing a disbursement of the prepaid amount of energy at a receiver node. The payment for the prepaid amount of energy is made using a receiver node identifier associated with the receiver node that receives the prepaid amount of energy. The source node receives input voltage from a power source. The input voltage provided by the power source is transformed into a micro-grid voltage that is distributed to the receiver node in a point-to-point wiring. The source node receives the input voltage until the prepaid amount of energy is distributed to the receiver node.

In another embodiment, a prepaid amount of energy is provided to a receiver node. The receiver node is coupled to a source node using a point-to-point wiring. The receiver node receives a prepaid amount of energy from the source node, where the prepaid amount of energy is transmitted using a micro-grid voltage. Upon receipt, the receiver node transforms the micro-grid voltage into an appliance-usable voltage and provides the appliance usable voltage to an electrical outlet, until the prepaid amount of energy is used up by an appliance.

In another embodiment, a method for paying for a prepaid amount of energy is provided. A request for a prepaid amount of energy is received by the energy management system, where the request includes a receiver node identifier associated with a receiver node that receives the prepaid amount of energy. A price for a unit of energy is queried and the price for the prepaid amount of energy is determined. A payment request is transmitted to the payment processing system for the determined amount. Upon the receipt of the authentication from the payment processing system that the determined amount was paid, energy management system causes a source node to connect the power source to the receiver node to disburse the prepaid amount of energy, where the source node and the receiver node are connected in a point-to-point wiring.

Further embodiments, features, and advantages of the invention, as well as the structure and operation of the various embodiments of the invention are described in detail below with reference to the accompanying drawings.

BRIEF DESCRIPTION OF THE DRAWINGS/FIGURES

The accompanying drawings, which are incorporated herein and form a part of the specification, illustrate embodiments of the invention and, together with the description, further serve to explain the principles of the invention and to enable a person skilled in the relevant art to make and use the invention.

Figure 1A:
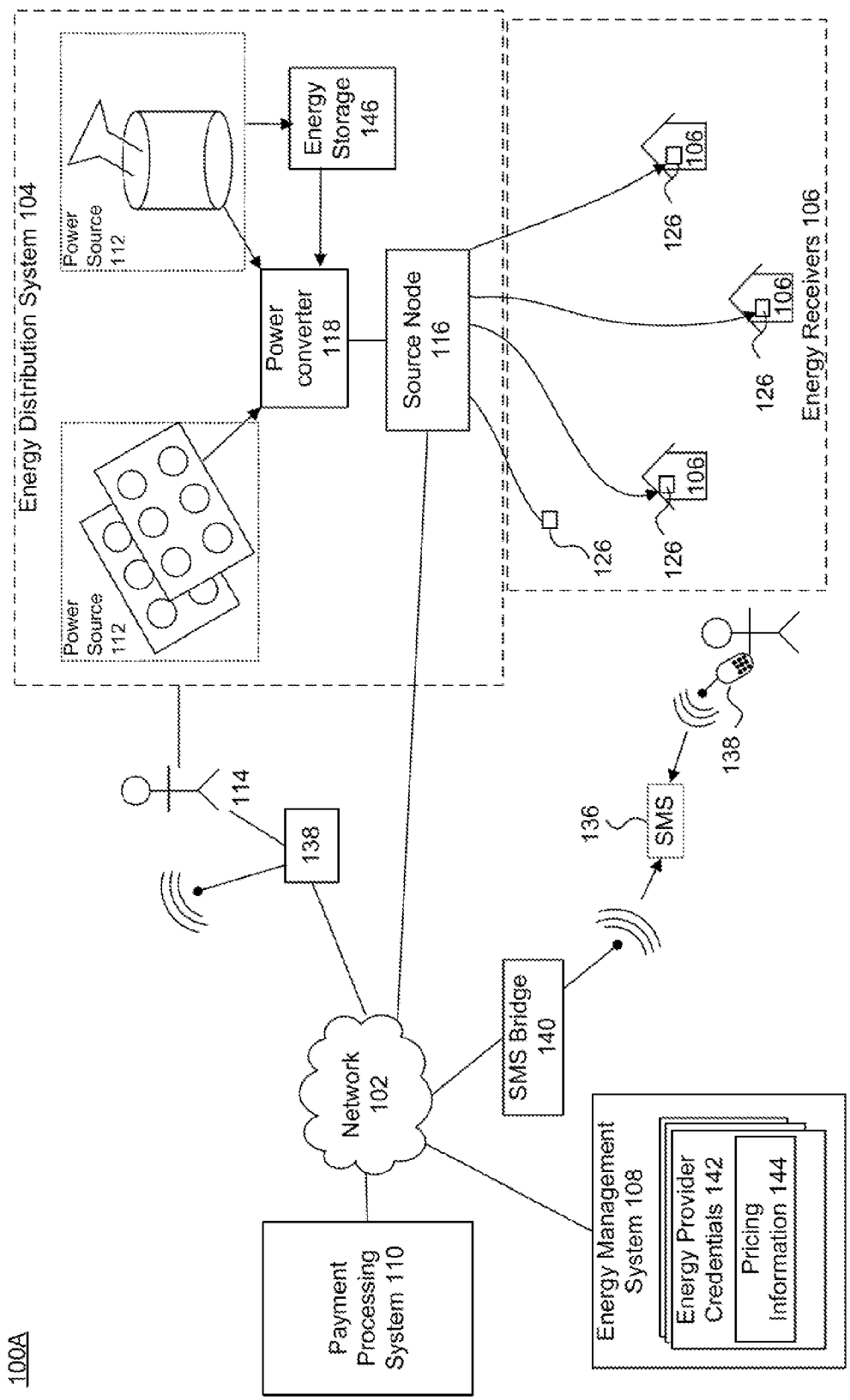
FIG. 1A is a block diagram of a self-organizing energy grid and payment system, according to an embodiment.

The invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF EMBODIMENTS

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

FIG. 1A is a block diagram 100A of a self-organizing energy grid and payment system, according to an embodiment. In one embodiment, energy grid and payment system includes a network 102, an energy distribution system 104, multiple energy receivers 106, energy management system 108, and a payment processing system 110.

Network 102 may be any network or combination of networks that can carry data communication. Such a network 102 may include, but is not limited to, a local area network, metropolitan area network, and/or wide area network such as the Internet. Network 102 can support protocols and technology including, but not limited to, World Wide Web (or simply the "Web"), protocols such as a Hypertext Transfer Protocol ("HTTP") protocols, and/or services. Intermediate web servers, gateways, or other servers may be provided between components of the system shown in FIG. 1A, depending upon a particular application or environment.

Energy distribution system 104 generates and distributes energy. Energy distribution system 104 includes multiple power sources 112. Power sources 112 may include a diesel energy generator, a solar panel, a bicycle generator, a wind turbine, a gasifier, a hydroelectric energy generator, geothermal power sources, oil power sources and gas power sources, and/or combinations thereof. Other power sources adapted to generate energy may be used. In one embodiment, energy distribution system 104 may be owned by a single energy provider 114. Energy provider 114 may use energy generated by power sources 112. Energy provider 114 may also elect to sell or distribute energy to multiple energy receivers 106.

For example, energy provider 114 may purchase, lease or build an energy distribution system 104. When energy distribution system 104 produces more energy than what is used by energy provider 114, energy provider 114 may sell the unused energy to energy receivers 106. In one embodiment, energy provider 114 distributes receiver nodes 126 (described below) to provide energy to energy receivers 106. Energy provider 114 may distribute receiver nodes 126 on his own property or in public places where they provide paid access to energy. In another embodiment, energy provider 114 may provide receiver nodes 126 for installation in homes, businesses, etc. Energy receivers 106 may then use receiver nodes 126 to pay for and access energy from energy distribution system 104.

In one embodiment, energy distribution system 104 may be subsidized by a third party. For example, energy provider 114 may buy or lease energy distribution system 104 from a third party. Example third parties may sell various power sources 112 to energy provider 114 at a subsidized rate. When energy provider 114 uses or distributes energy provided by power sources 112, these third parties may collect a fraction of the profit (or revenue) that power sources 112 generate. This arrangement may continue indefinitely, or until energy provider 114 pays a pre-agreed price for each power source 112. In one embodiment, when energy provider 114 sells energy to energy receivers 106, energy provider 114 may use a portion of the sale price to pay for power sources 112 that are purchased or loaned from the third parties. In other embodiments, energy distribution system 104 may be owned by a plurality of energy providers 114 which may group energy resources.

In one embodiment, to provide energy over a distance, energy distribution system 104 includes a power converter 118. Power converter 118 transforms input voltage from power sources 112 into a voltage, such as, micro-grid voltage that is distributed to receiver nodes 126. For example, power converter 118 converts energy produced by power source 112 into voltage that may be carried a moderate distance with a minimal energy loss.

In an embodiment, power converter 118 may be an alternative current (AC) to direct current (DC) power converter. In another embodiment, power converter 118 may be a DC-DC power converter. A person skilled in the art will appreciate that when voltage, such as micro-grid voltage, is transmitted over moderate distances, less power may be dissipated or lost when the micro-grid voltage is transmitted as a DC voltage. In a non-limiting example, power converter 118 may convert power that it receives from power source 112 in the range of, for example, 100 to 1000 watts, and convert the power to a DC circuit having a voltage of 100-600 VDC. These values are meant to be exemplary only, and in some embodiments power converter 118 may be adapted to convert power to other desirable voltage levels.

Figure 1B:
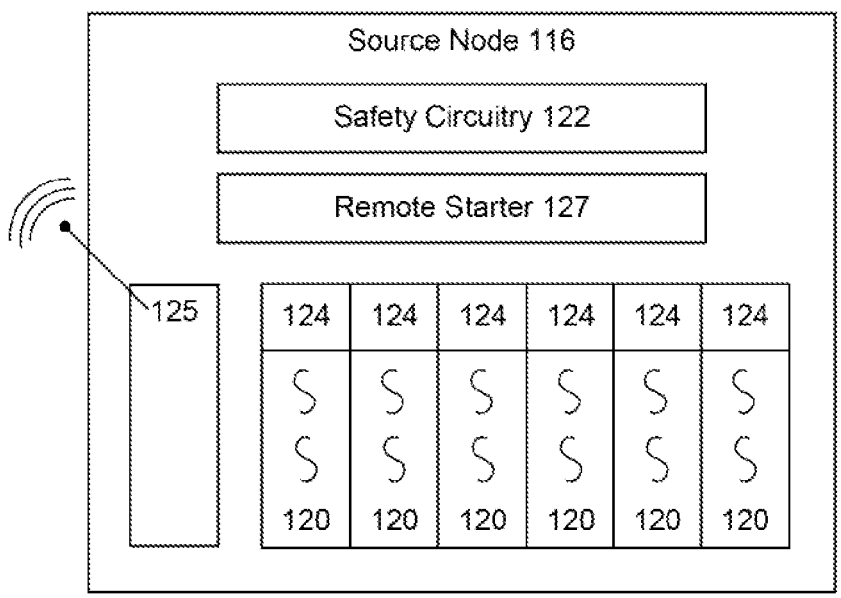
FIG. 1B is a block diagram of a source node, according to an embodiment.

To sell or distribute energy generated by power sources 112, energy distribution system 104 includes a source node 116. FIG. 1B is a block diagram 100B of an exemplary source node, according to an embodiment. Source node 116 includes smart meters 120, safety circuitry 122, output channels 124, a communication interface 125 and a remote starter 127.

Smart meter 120 regulates and measures power between receiver nodes 126 and power sources 112. Smart meter 120 connects and measures the transfer of energy between power source(s) 112 and receiver nodes 126. Smart meter 120 also measures the units of energy that were distributed to receiver nodes 126. Smart meter 120 also terminates the transfer of energy from power source 112 to receiver node 126 after the paid for amount of energy was transferred. In an embodiment, smart meter 120 may transmit the amount of energy units that were distributed to energy management system 108 for record keeping.

Safety circuitry 122 may be provided to prevent, or limit the effects of, a short circuit in energy distribution system 104. A short circuit may occur when a small delta is detected between power that enters source node 116 and the power that exits source node 116. Safety circuitry 122 may disconnect source node 116 from power source 112 and prevent a person who may come into contact with source node 116 or receiver node 126 from being electrocuted. An example safety circuitry 120 may include a ground fault circuit interrupter (GFCI), a ground fault interrupter (GFI) and an appliance leakage current interrupter (ALCI), that are known to a person of ordinary skill in the art.

Once power converter 118 converts the received energy into a micro-grid voltage, source node 116 transmits voltage to receiver nodes 126 as regulated by smart meter 120. Source node 116 uses output channel 124 to transmit energy to receiver nodes 126. In an embodiment, each output channel 124 may include its own safety circuitry 122. Each output channel 124 may also be connected to a particular smart meter 120.

In an embodiment, source node 116 may include a remote starter 127. Remote starter 127 may automatically activate power source 112 when power source 112 is inactive and a request for energy is received. For example, in case of a diesel power source, remote starter 127 may activate the diesel power source. In another example, in the case of a solar panel, for example, remote starter 127 may connect the charging battery to the solar power source.

Additionally, source node 116 includes a communication interface 125. Communication interface 125 allows source node 116 to communicate with energy management system 108 and payment processing system 110 over network 102. Based on payment, source node 116 may cause smart meters 120 to deliver energy from power source 112 to receiver nodes 126.

Energy receivers 106 receive energy from energy distribution system 104. Example energy receivers 106 include households, stores, restaurants, gas stations, airports, utilities, general public, and other energy consuming locations. When energy provider 114 agrees to provide energy to energy receiver 106, energy provider 114 provides energy receiver 106 with receiver node 126 and electrical wires or other necessary electrical components. Electrical wires connect source node 116 to receiver node 126, in for example, point-to-point wiring. In various embodiments, energy provider 114 may lease, sell and/or give away receiver nodes 126 to energy receivers 106. Moreover, in an embodiment energy provider 114 may install receiver nodes 126 on his own property or public locations by running point-to-point wiring between receiver nodes 126 and source node 116.

Figure 1C:
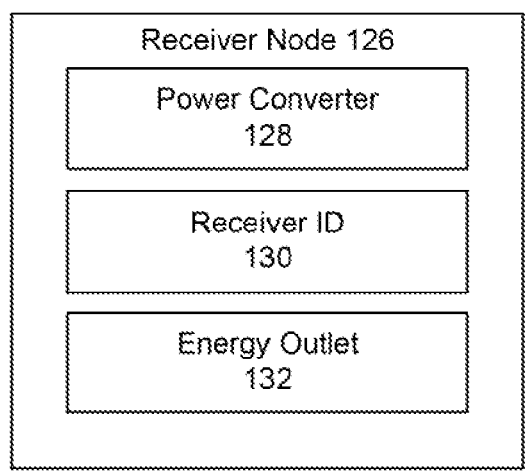
FIG. 1C is a block diagram of a receiver node, according to an embodiment.

FIG. 1C is a block diagram 100C of an exemplary receiver node. Receiver node 126 includes a power converter 128 and a receiver node identifier 130 (also referred to as "receiver ID".) Power converter 128 converts the distributed voltage that may be micro-grid voltage, to a voltage that may be used by, for example, electric appliances used by energy receiver 106. Power converter 128 may be an AC-DC to DC-DC converter, and generally depends on the type of voltage provided by source node 116. Example converted voltage may be voltage that measures as 240 VAC or 12 VDC volts. Once converted, receiver node 126 uses energy outlet 132 to distribute energy to electric appliances when energy receiver 106 inserts electric appliance into electrical outlet 132.

Receiver ID 130 identifies receiver node 126. In an embodiment, receiver ID 130 is unique to a particular receiver node 126. In an embodiment, energy receiver 106 may include receiver ID 130 in a request for energy, when energy receiver 106 requests energy from energy distribution system 104.

In an embodiment, receiver node 126 may also be connected to (or include) a display screen. Display screen displays the amount of energy that receiver node 126 distributes using energy outlet 132. Display screen may also display a price for unit of energy that energy receiver 106 pays to energy provider 114 to receive energy. In other non-limiting embodiments, display screen may also provide an indication of amount of energy that remains to be distributed (based on the prepaid amount). A person skilled in the art will appreciate that display screen may include texts, LEDs and other visual display elements to convey the above information.

In an embodiment, energy provider 114 may distribute energy to himself, also using receiver node 126. For example, energy provider 114 may use receiver nodes 126 to provide energy to a dwelling or entity associated with energy provider 114. In this scenario, energy provider 114 may configure receiver node 126 to have a priority to receive energy from power sources 112 over receiver nodes 126 that it allocates to other energy receivers 106.

With renewed reference to FIG. 1A, in one embodiment energy distribution system 104 may also include an energy storage unit 146. Energy storage 146 stores energy generated by power sources 112. Typically, a power source 112 that is a generator may have a built-in energy storage 146. However, a power source 112 that is a solar panel, may be equipped with a chargeable battery that may be charged when power source 112 is active. When energy distribution system 104 is inactive, energy receiver 106 may request energy and receive the requested energy from energy storage 146. This may provide energy receiver 106 with energy when energy distribution system 104 is inactive or offline. This may also reduce a possibility of a scenario where energy receiver 106 requests energy and is not provided with any because power sources 112 are inactive or offline.

In one embodiment, energy management system 108 is a module stored on a computing device that allows for management of energy. Energy management system 108 allows energy providers 114 to manage energy distribution provided by energy distribution systems 104. In a non-limiting example, energy provider 114 may use energy management system 108 to configure receiver nodes 126 to a particular energy distribution system 104, to prioritize receiver nodes 126 for energy distribution (for example, when demand for energy exceeds supply), and to set a price for a unit of energy that is offered for sale.

In another embodiment, energy management system 108 may also monitor demand for energy in energy distribution system 104. For example, energy management system 108 may determine the amount of watt-hours or kilowatt-hours that energy receivers 106 purchased and/or received from a particular energy distribution system 104. The amount of watt-hours or kilowatt-hours purchased by various energy receivers 106 allows energy management system 108 to monitor the energy load on energy distribution system. In another example, energy management system 108 may receive messages from energy distribution system 104 that include the distributed amount of watt-hours or kilowatt-hours.

In another embodiment, based on the monitoring, energy management system 108 may generate an alert to an operator or energy distributor 114 that a demand for energy is increasing. Those alerts may allow the operator or energy distributor 114 to increase the amount of distributed energy that may be distributed or prioritize energy distribution to energy receivers 104 who are willing to pay a premium. In another embodiment, energy management system 108 may generate an alert when demand for energy is close to, or exceeds the amount of energy produced by energy distribution system 104.

In another embodiment, energy management system 108 many analyze demand for energy. For example, energy management system 108 may analyze past energy usage by energy receivers 106, and determine the periods during a day, a week, a month or a year that have high or low demand for energy. This allows energy distributors 114 to set energy pricing in accordance with the supply or demand for energy. For example, energy distributors 114 may increase the price for each distributed watt-hour during peak times, and decrease the price for each distributed watt-hour of energy during off times.

In another embodiment, energy management system 108 may identify anomalous behavior by receiver nodes 126. Example anomalous behavior may include potential short circuits, high power loads that were left on, unusual power patterns that may indicate energy fraud or theft, etc. When anomalous behavior is identified, energy management system 104 may generate alerts to the operator or energy distributor 114.

In an embodiment, to use energy management system 108, energy provider 114 registers with energy management system 108. After registration, energy provider 114 receives an energy provider identifier. Energy provider 114 uses the energy provider identifier to access energy management system 108 and configure energy distribution system 104, set pricing information 144 for each unit of energy generated by energy distribution system 104, associate receiver nodes 126 with energy distribution system 104, and prioritize the receipt of energy by different receiver nodes 126.

In an embodiment, energy management system 108 stores energy provider credentials 142 that are associated with each energy provider 114. Credentials 142 may be stored by the energy provider identifier associated with each energy provider 114. Credentials 142 include a listing of energy distribution systems 104 associated with each energy provider 114, the pricing information 144 for each unit of energy set by energy providers 114 and a listing of receiver ID 130 that are associated with each receiver node 126 that receives energy from energy distribution system 104. Energy provider 114 may access credentials 142 and modify pricing information 144 based on supply and demand for energy, add receiver nodes 126 by adding their associated receiver IDs 130, or configure a new energy distribution system 104.

In an embodiment, energy provider 114 accesses energy management system 108 using a computing device 138. In one embodiment, computing device 138 is an electronic device that is under the control of energy provider 114, and is capable of requesting and receiving resources from other computing devices 138 over network 102. Example computing devices 138 include, but are not limited to, desktop computers, laptop computers, mobile communication devices, such as smart phones, cell phones and tablet computers. In other embodiments, computing device 138 may be a publicly accessible device, such as, for example, a computing kiosk. Computing device 138 typically includes an application, such as a web browser, that energy provider 114 uses to access energy management system 108. For example, energy provider 114 requests access to energy management system 108 by typing the website address associated with a server that hosts energy management system 108. When a webpage associated with energy management system 108 is downloaded on the display screen of computing device 138, in one embodiment, the webpage presents energy provider 114 with a login interface. Energy provider 114 may use the webpage to enter credentials 142, such as, energy provider identifier and a corresponding password to access his account in energy management system 108.

Payment processing system 110 processes payments from energy receivers 106 to energy providers 114. In one embodiment, payment processing systems 110 may be accessed using computing devices 138. For example, in one embodiment, energy receiver 106 may use the Web to make a payment.

In another embodiment, energy receiver 106 may make a payment using a Short Messages Server (SMS). The SMS service provides a text messaging component to Web and mobile communication systems. For example, energy receiver 106 generates an SMS message 136 to energy management system 108. Energy receiver 106 may obtain the number to transmit SMS message 136 to from receiver node 126, from a prepaid SMS card associated with energy distribution system 104, or from energy provider 114. In one embodiment, SMS messaging information may be provided on receiver node display screen 134. SMS message 136 may include a receiver ID 130 associated with receiver node 126 from where energy receiver 106 wants to obtain energy, requested units of energy, in, for example, watt-hours, kilowatt-hours, or another energy unit specified by energy provider 114, and a method of payment. Example methods of payment may include a phone number associated with energy receiver 106, when energy receiver 106 wishes to make a payment using an account associated with computing device 138. Another method of payment may include a prepaid SMS card. In this case, energy receiver 106 enters the number of the prepaid SMS card in SMS message 136, and causes payment processing system 110 to subtract the determined amount, as described below.

Energy receiver 106 uses computing device 138 to transmit SMS message 136 over network 102. In an embodiment, SMS message 136 may be transmitted using an SMS bridge 140. SMS bridge 140 receives SMS messages 136 from multiple energy receivers 106 and provides efficient and economical interface for transmitting those messages to energy management system 108.

When energy management system 108 receives SMS message 136, it extracts receiver ID 130 and the requested units of energy. Based on receiver ID 130, energy management system 108 may identify energy provider 114 that owns receiver node 126 from which energy receiver 106 requested energy. Energy management system 108 queries the price per unit of energy that energy provider 114 set for energy distribution system 104 that provides energy to receiver node 126. For example, energy provider 114 may configure pricing information 144 for each unit of energy based on the demand, supply, load on energy distribution system 104, time of day, day of the week, and/or other distribution factors and combinations thereof.

Energy management system 108 then determines the payment based on price information 144. In one embodiment, a payment amount may be determined by multiplying the amount of energy requested by energy receiver 106 by price information 144 for a unit of energy that is set by energy distributor 114. A discount, if any, may also be applied by energy management system 108. For example, energy receiver 106 may use receiver node 126 that has a low priority of receiving energy when demand exceeds a supply, but receives a discount for a receipt of each unit of energy.

When energy management system 108 determines the price that energy receiver 106 pays for the requested units of energy, a payment is requested. In one embodiment, energy management system 108 sends a request for payment to a payment processing system 110. The request includes energy receiver's 106 identifier that links energy receiver 106 to his payment information, such as a mobile number account or a prepaid card account, and a determined payment amount for the prepaid amount of energy.

In one embodiment, payment processing system 110 may be an established third-party processing system that processes payments made using computing devices 138, such as mobile phones, etc., over network 102. In an embodiment, payment processing system 110 may be a cloud-based system known to a person of ordinary skilled in the art. Upon receipt of the payment request, payment processing system 110 determines whether energy receiver 106 agrees to pay the requested payment. For example, payment processing system 110 may send an SMS message to energy receiver 106 that includes the payment amount determined by energy management system 108. In a further example, payment processing system 110 may request an authorization from energy receiver 106 prior to processing the payment from energy receiver's 106 bank account or by billing the payment to energy receiver 106. In an embodiment, an SMS message may notify energy receiver 106 when the payment account does not include sufficient funds to pay for the requested amount of energy. In this case, the SMS message may also inform energy receiver 106 that additional funds may be required to complete the transaction. In another embodiment, payment processing system may be owned and/or operated by energy distributor 114.

When energy receiver 106 authorizes the transaction, payment processing system 110 either bills energy receiver 106 for the authorized sum or authorizes the transfer of funds from a payment account associated with energy receiver 106 to the account associated with energy provider 114. When energy receiver 106 pays using a prepaid card, such as, for example, an SMS card, payment processing system 110 deducts the authorized payment amount from the account associated with the prepaid card.

When the funds are transferred, payment processing system 110 transmits a response message to energy management system 108 that the transaction is complete. Response message may include payment information, such as a payment amount, the time and date of payment.

When energy management system 108 receives the response message, energy management system 108 authorizes energy distribution system 104 to provide energy. For example, energy management system 108 transmits an energy distribution message to communication interface 125 included in source node 116.

In one embodiment, upon receipt of the energy distribution message from energy management system 108, smart meter 120 in source node 116 connects output channel 124 that feeds energy to receiver node 126 from which energy receiver 106 requested energy. When smart meter 120 connects output channel 124 to power source 112, energy flows from source node 116 to receiver node 126. In an embodiment, energy flows until the prepaid units of energy have been dispensed or used by an appliance connected to energy outlet 132.

In an embodiment, when the prepaid amount of energy is dispensed, or energy receiver 106 disconnects the appliance from receiver node 126, energy provider 114 may receive an energy statement. The energy statement may include the amount of energy that was distributed, the amount paid for the energy, the amount of energy in energy distribution system 104 that remains for distribution, energy distribution system 104 performance, etc. In an embodiment, energy provider 114 may receive the energy statement as an SMS message. In another embodiment, the statement may be stored in energy management system 108 in an account associated with energy provider 114. In one embodiment, some or all of the statement information may be displayed on receiver node display screen 134.

Figure 2:
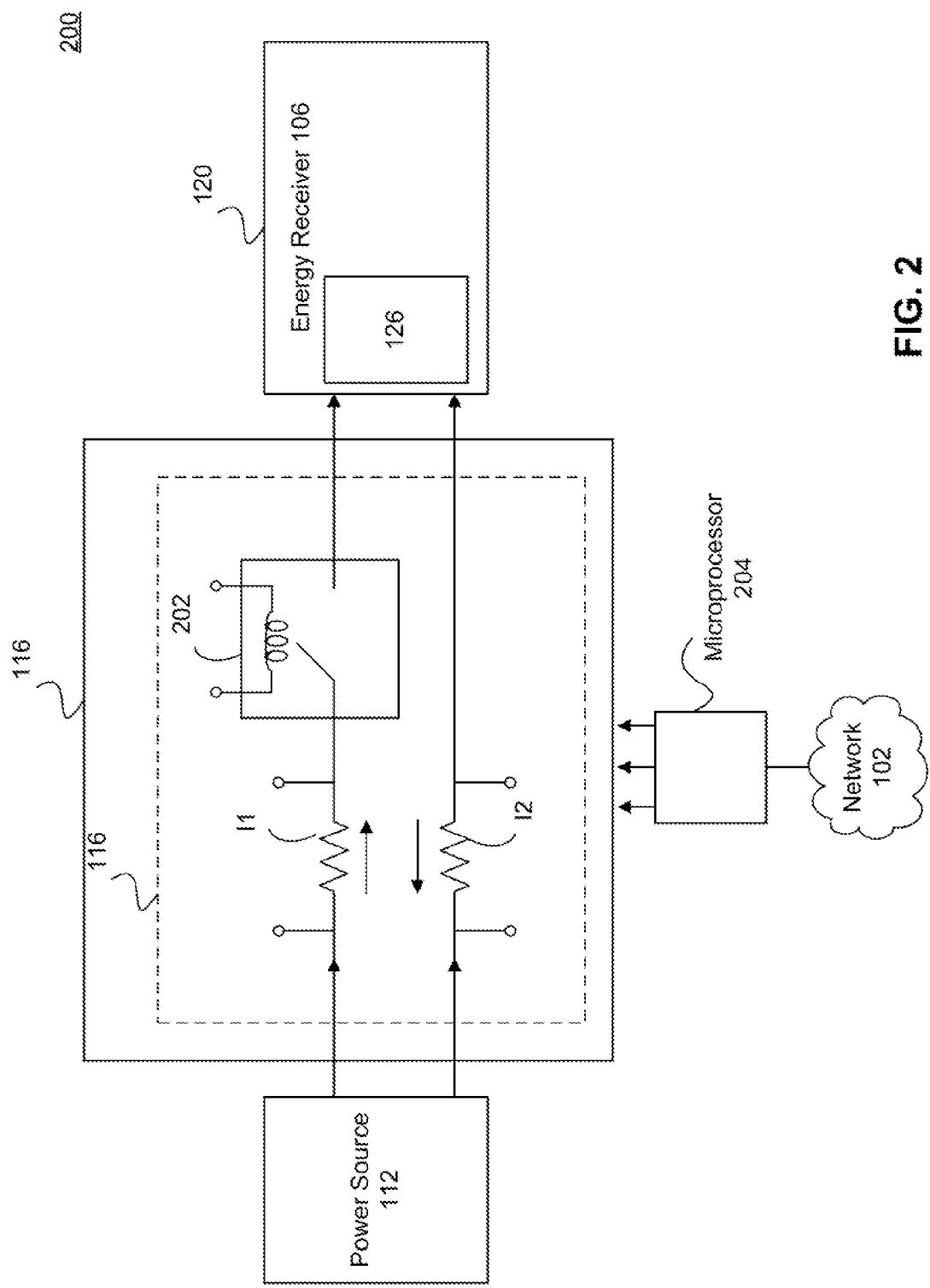
FIG. 2 is a block diagram of a smart meter, according to an embodiment.

FIG. 2 is a block diagram 200 of a smart meter, according to an embodiment. Although an exemplary circuitry of smart meter 120 that includes resistors (or hall sensors or other current sensors) and a relay (or another current switching device) that passes electric currents I1 and I2 is shown in block diagram 200, the design is not limiting as smart meters are known to a person of ordinary skill in the art.

Smart meter 120 measures the amount of energy that power source 112 transmits to receiver node 126. For example, when communication interface 125 receives the amount of prepaid energy that power source 112 may distribute to receiver node 126, smart meter 120 may actuate (e.g., close) an energy switch 202 and begin to deliver the prepaid amount of energy. Once smart meter 120 determined that the prepaid amount of energy was delivered to receiver node 126, smart meter 120 may actuate (e.g., open) energy switch 202 and discontinue the flow of energy from power source 112 to receiver node 126. Smart meter 120 may then use communication interface 125 to communicate to energy management system 108 that the prepaid amount of energy was distributed to receiver node 126.

To calculate the amount of energy that flows through source node 116 and process instructions received from communication interface 125, smart meter 120 may include a microprocessor 204. In one embodiment, microprocessor 204 may be a processor described in detail in FIG. 9. Microprocessor 204, in one embodiment, receives the measurements for currents and resistors. Based on those measurements, microprocessor 204 calculates the amount of energy that power source 112 distributes to receiver nodes 126. Microprocessor 204 may be included as part of smart meter 120 in one embodiment. In another embodiment, smart meters 120 within source node 116 may share microprocessor 204.

Figure 3:
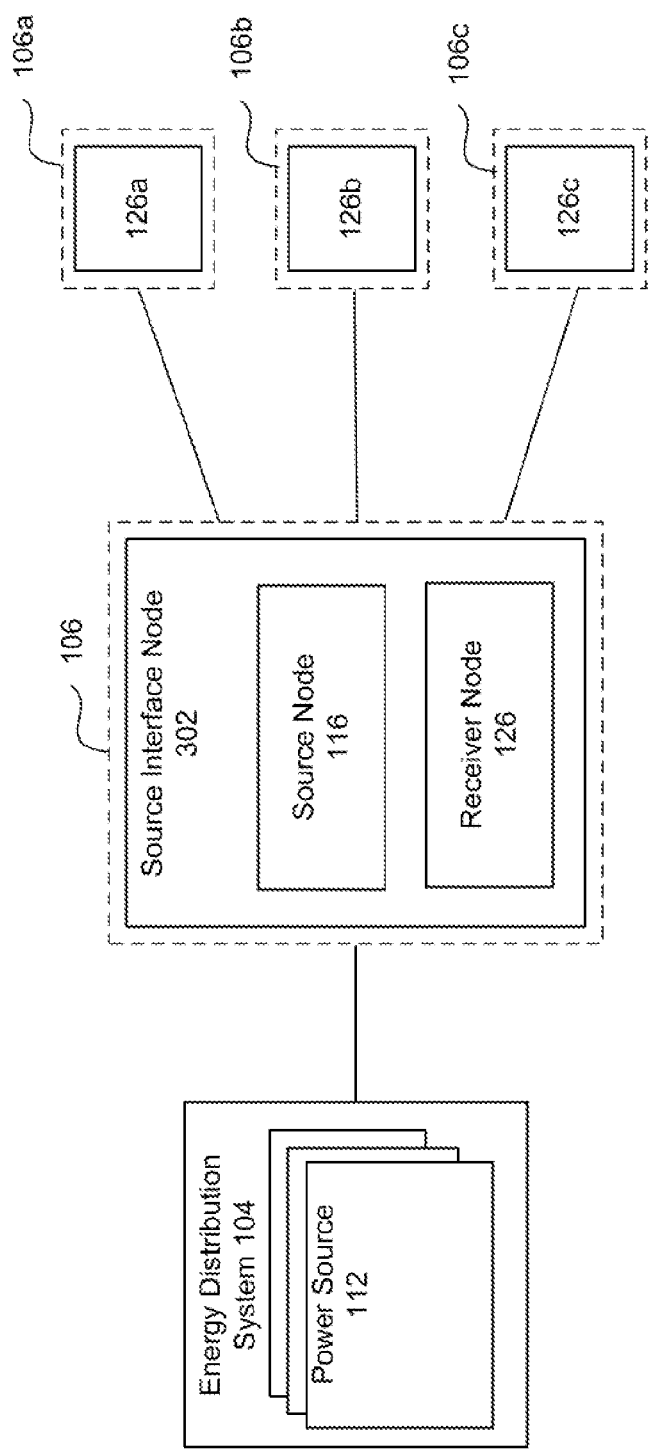
FIG. 3 is a block diagram of an energy grid with a source interface node, according to an embodiment.

FIG. 3 is a block diagram 300 of a source interface node, according to an embodiment. Source interface node 302 allows energy receiver 106 to become energy provider 114 without actually owning or leasing power source 112. In an embodiment, energy receiver 106 may purchase a source interface node 302 from energy provider 114. In another embodiment, energy receiver 106 may purchase source interface node 302 from a third party that, for example, leases power source 112 to energy provider 114. Energy receiver 106 may then connect the purchased source interface node 302 to power source 112 or the energy output generated by power converter 118 in energy distribution system 104. For example, energy receiver 106 may use a cable or another type of wiring.

Energy receiver 106 that has possession of source interface node 302 may open an account in energy management system 108 and set his own pricing for distributing energy through source interface node 302. To use power sources 112 in energy distribution system 104, however, energy receiver 106 that has possession of source interface node 302 may pay a premium to energy distributor 114 or a third party that owns power source 112. In an embodiment, energy receiver 106 may pay a percentage of fees collected from other energy receivers 106, such as energy receivers 106a-c, that receive energy using source interface node 302.

Source interface node 302 includes source node 116 and receiver node 126. Source node 116 within source interface node 302 is adapted to provide the metering and access to energy.

Receiver node 126 within source interface node 302 allows energy receiver 106 who purchased source interface node 302 to receive energy. For example, receiver node 126 provides energy receiver 106 with power converter 118 to convert energy distributed by source interface node 302, receiver ID 130 to request energy using energy management system 108 and energy outlet 132 to access energy.

Additionally, in one embodiment source interface node 302 allows other energy receivers 106, such as energy receivers 106a, 106b and 106c, to access power using source interface node 302. For example, energy receivers 106a-c may use point-to-point wiring to attach receiver nodes 126a-c to source interface node 302 and receive energy.

In an embodiment, energy distribution system 104 that includes source interface nodes 302 includes a prioritization mechanism for prioritizing energy distribution. For example, when demand for power exceeds the supply generated by power sources 112, source nodes 116 that are owned by energy provider 114 and their corresponding receiver nodes 126 may receive power prior to source interface nodes 302. In another embodiment, energy provider 114 may use energy management system 108 to configure the prioritization between source interface nodes 302 and receiver nodes 126.

Figure 4:
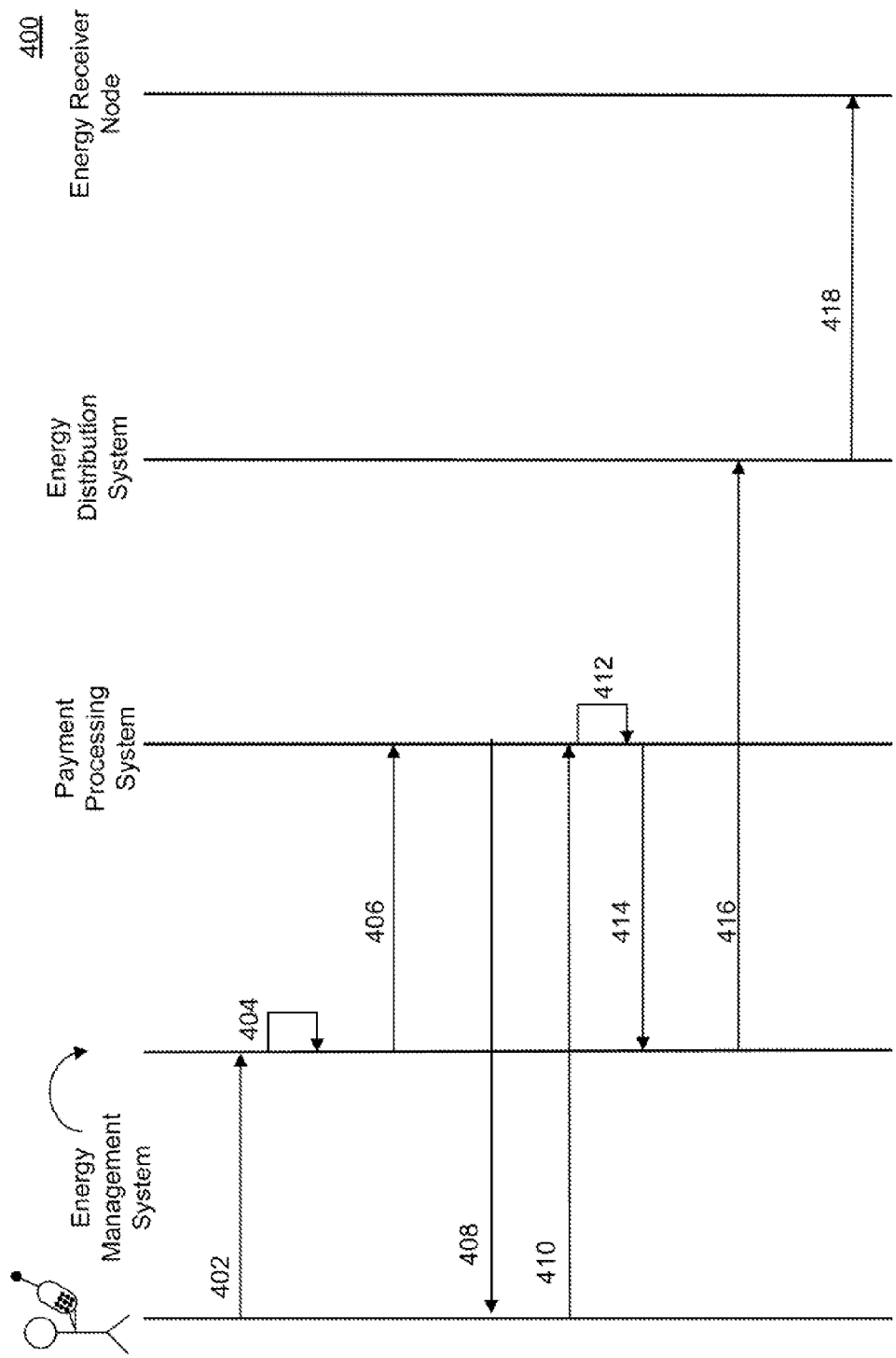
FIG. 4 is an event diagram for receiving a prepaid amount of energy, according to an embodiment.
Figure 5:
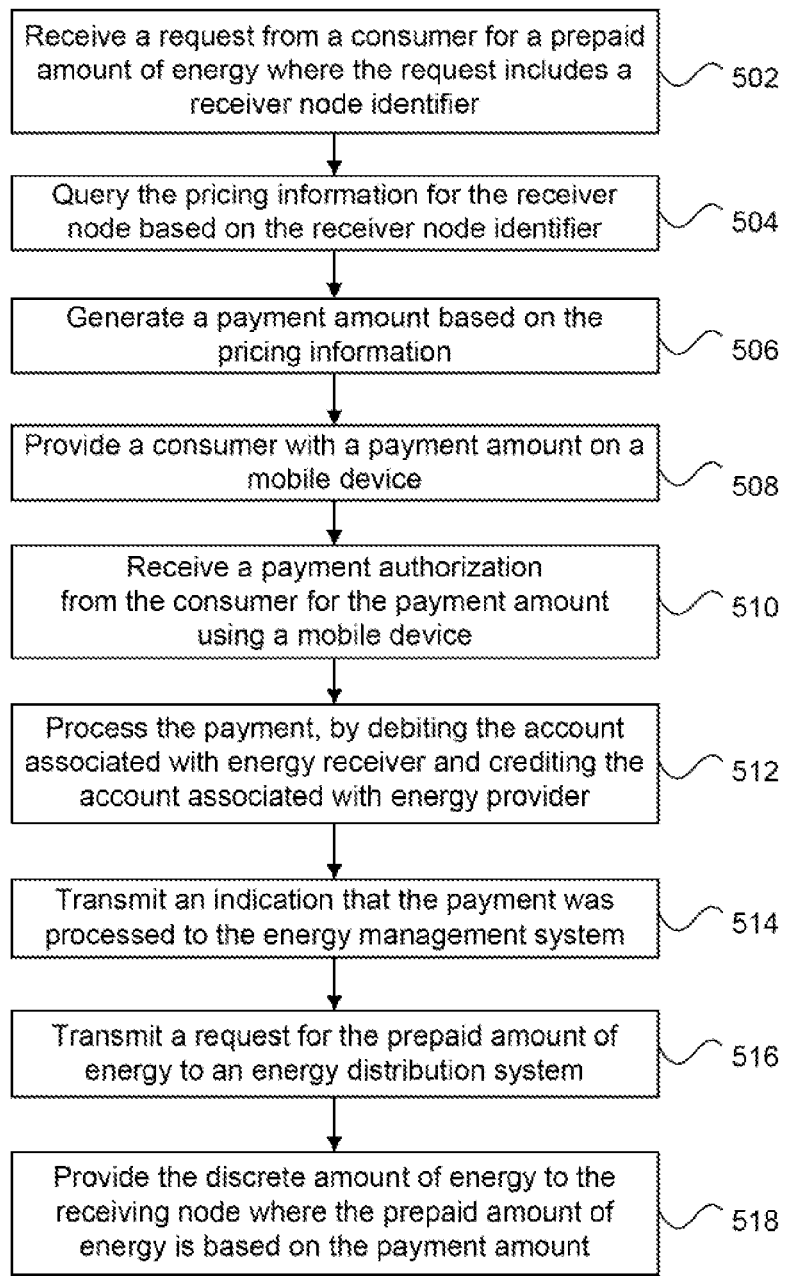
FIG. 5 is a flowchart of a method for receiving a prepaid amount of energy, according to an embodiment.

FIG. 4 is an event diagram 400 for processing a payment for a prepaid amount of energy, according to an embodiment. FIG. 5 is a flowchart 500 of a method that represents each stage 402-416 in event diagram 400.

At stage 402, (stage 502 in FIG. 5), energy is requested. For example, energy receiver 106 requests a prepaid amount of energy from energy management system 108. In one embodiment, the request may be made using SMS message 136. SMS message 136, or any other request, may include a receiver ID 130, the amount of energy requested and billing information of energy receiver 106. As described herein, receiver ID 130 is associated with receiver node 126 from which energy receiver 106 wants to receive energy.

At stage 404, (stage 504 in FIG. 5), energy management system identifies the pricing information for a unit of energy. For example, energy management system 108 queries an energy provider account associated with energy provider 114 and identifies energy distribution system 104 that provides energy to receiver node 126 that is associated with the receiver ID 130. Once the energy distribution system 104 is identified, energy management system 108 queries the pricing information for the discrete unit of energy to be provided to receiver node 126.

At stage 406, (stage 506 in FIG. 5), a payment amount is generated and the payment process begins. For example, energy management system 108 generates the payment amount that energy receiver 106 needs to pay for the requested energy, as described herein. When the payment amount is generated, energy management system 108 sends a message to payment processing system 110. The message includes the generated payment amount and the credentials of energy receiver 114.

At stage 408, (stage 508 in FIG. 5), a payment amount is transmitted to a computing device of an energy receiver. When payment processing system 110 receives the message from energy management system 108, a payment process is initiated. Payment processing system 110 uses the credentials of energy receiver 114 to identify the payment account associated with energy receiver 106, or, in case of a prepaid card, such as a prepaid SMS card, the amount of money that remains in the payment account associated with the prepaid SMS card. Prior to completing the payment process, payment processing system 110 generates a message, such as an SMS message, that includes a payment amount to computing device 138 that is associated with energy receiver 106. As described herein, the message includes the payment amount determined by payment processing system 110. The message also includes a payment authorization, that, when received from energy receiver 106, authorizes the payment for energy from account of energy receiver 106 to energy provider 114. In an embodiment, when the payment account of energy receiver 106 does not include sufficient funds to pay for the requested amount of energy, the message may also inform energy receiver 106 that additional funds may be required to complete the transaction.

At stage 410, (stage 510 in FIG. 5), the payment is processed. For example, energy receiver 106 uses computing device 138 to view a message from payment processing system 110. When energy receiver 106 authorizes the payment amount, computing device 138 receives an authorization from energy receiver 106 and transmits the authorization to payment processing system 110. When energy receiver 106 does not agree to proceed with the payment amount or makes a final determination not to authorize the payment, the payment process ends.

At stage 412, (stage 512 in FIG. 5), the payment is processed. Upon receipt of the authorization from energy receiver 106, payment processing system 110 debits the payment account associated with energy receiver 106 and credits the account associated with energy provider 114. Payment processing system 110 also generates a message to energy management system 108 that the payment was processed.

At stage 414, (stage 514 in FIG. 5), an indication that the payment was authorized and processed is transmitted to an energy management system. Once payment processing system 110 completes payment, it generates a message that includes information about the payment to energy management system 108. Example information may include the payment amount and the time and date of payment.

At stage 416, (stage 516 in FIG. 5), a request is transmitted for energy disbursement. For example, energy management system 110 transmits a request to energy distribution system 104 to initiate energy distribution. Upon receipt, source node 116 begins to distribute energy to receiver node 126 as described in detail in FIG. 6, below.

At stage 418, (stage 518 in FIG. 5), a paid for amount of energy is distributed. For example, source node 116 includes smart meter 120 that distributes the amount of energy in, for example, watt-hours or kilowatt-hours that is being distributed to receiver node 126. Once the paid for amount of energy is distributed to receiver node 126, smart meter 120 opens energy switch 202 and terminates the connection. Once a connection is terminated, energy receiver 106 may buy more energy to be transmitted to a particular receiver node 126 by sending SMS message 136 with the receiver ID 130 to energy management system 108.

Figure 6:
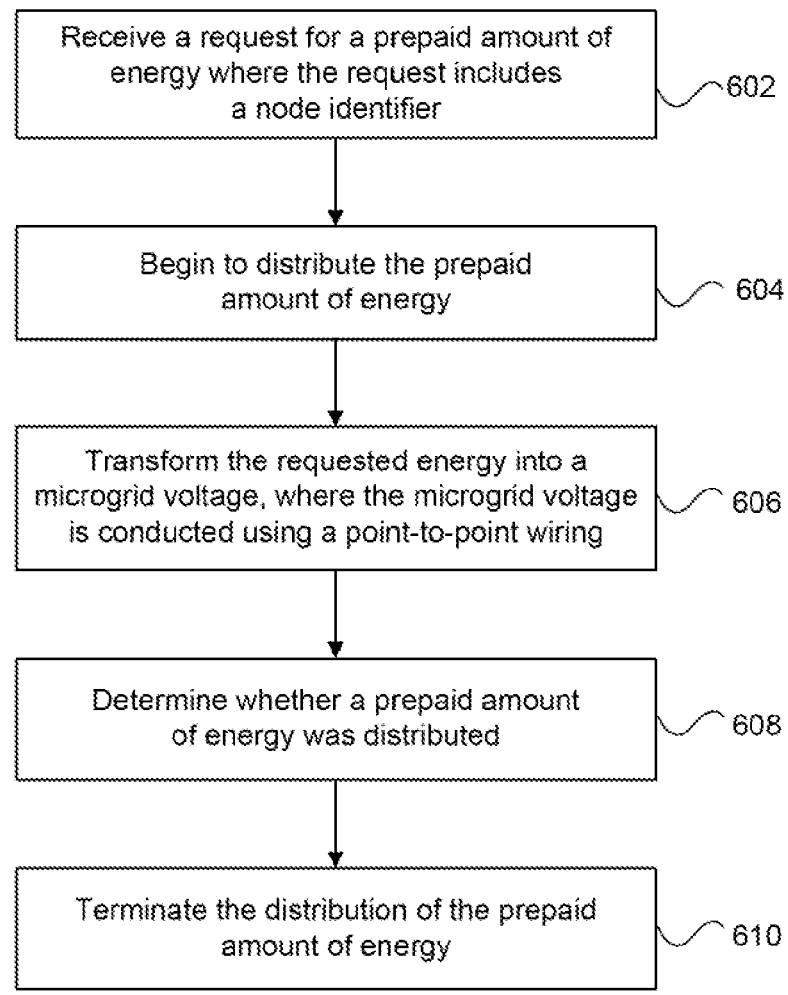
FIG. 6 is a flowchart of a method for a source node processing a request to distribute a prepaid amount of energy, according to an embodiment.

FIG. 6 is a flowchart 600 of a method for a source node processing a request to distribute a prepaid amount of energy, according to an embodiment.

At stage 602, a request to process a prepaid amount of energy is received. For example, source node 116 in energy distribution system 104 receives the request using communication interface 125. Once received, source node 116 identifies receiver node 126 that will receive energy by identifying the receiver ID 130 included in the message. Once identified, source node 116 causes smart meter 120 to close the energy switch that provides energy to receiver node 126 to distribute the prepaid amount of energy.

At stage 604, energy is distributed. For example, once the energy switch is closed, voltage from power source 112 is provided to receiver node 126. In another embodiment, when power source 112 is off-line, voltage may be provided by remote starter 127.

At stage 606, the energy provided by a power source is transmitted as a distributed voltage. As current begins to flow to source node 116, power converter 118 generates voltage, such as, a micro-grid voltage that is carried to receiver node 126 using output channel 124. In an embodiment, power converter 118 may be an AC-DC or a DC-DC power converter. Once power converter 118 generates voltage, the voltage is carried to receiver node 126 using point-to-point wiring.

At stage 608, a determination is made whether the prepaid amount of energy was distributed. In an embodiment, smart meter 120 determines the amount of energy (e.g., watt-hours or kilowatt-hours) that was distributed to receiver node 126. When the prepaid amount of watt-hours or kilowatt-hours was distributed, the flowchart proceeds to stage 610.

At stage 610, the energy distribution is terminated. Once power source 112 distributes the prepaid amount of energy to receiver node 126, energy distribution is terminated. For example, when source node 126 measures that the prepaid amount of energy was distributed, source node 126 causes energy switch 120 to open. Once energy switch 120 is opened, current stops flowing to output channel 124 and the distribution of energy is terminated.

Figure 7:
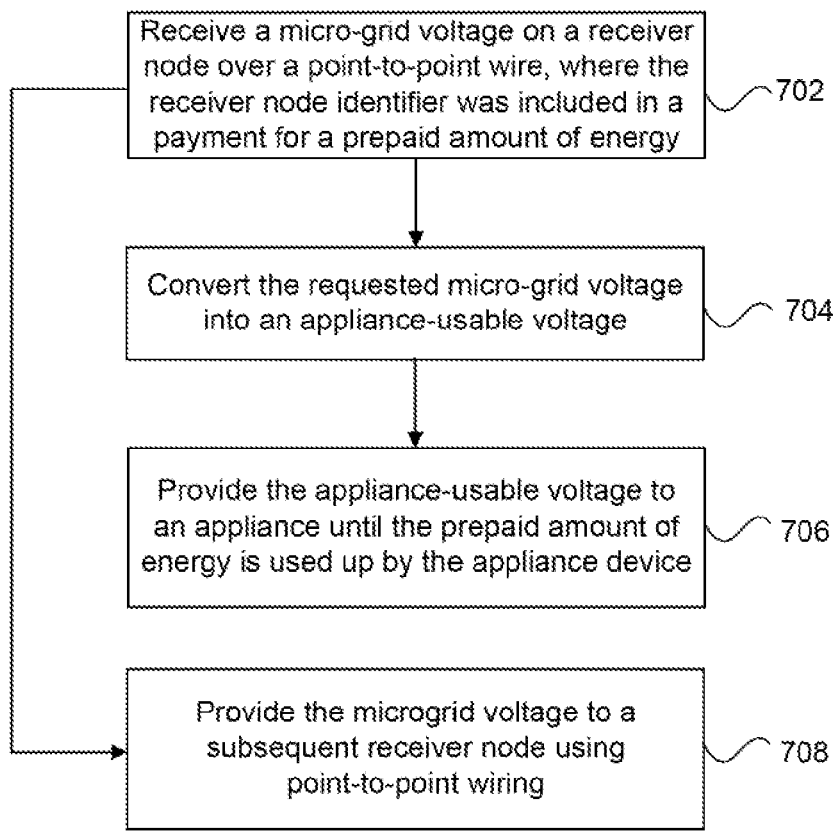
FIG. 7 is a flowchart of a method for receiving a prepaid amount of energy, according to an embodiment.

FIG. 7 is a flowchart 700 of a method for receiving a prepaid amount of energy, according to an embodiment.

At stage 702, energy is received. For example, receiver node 126 receives voltage, such as, micro-grid voltage from source node 116, via, in an embodiment, point-to-point wiring.

At stage 704, the received energy is transformed to a usable voltage. Once receiver node 126 receives voltage, receiver node 126 uses power converter 118 to convert the voltage, such as micro-grid voltage to an appliance-usable voltage. As described herein, the appliance-usable voltage, such as a particular VAC or VDC, may depend on a particular country or region in the word.

At stage 706, energy is provided to the appliance. The converted VAC of VDC voltage is provided to the appliance until the prepaid amount of energy is used up by the appliance.

It is important to note, that in an embodiment where source interface node 302 receives energy in stage 702, source interface node 302 may transmit the received energy to receiver nodes 126 that are connected to source interface node 302.

Figure 8:
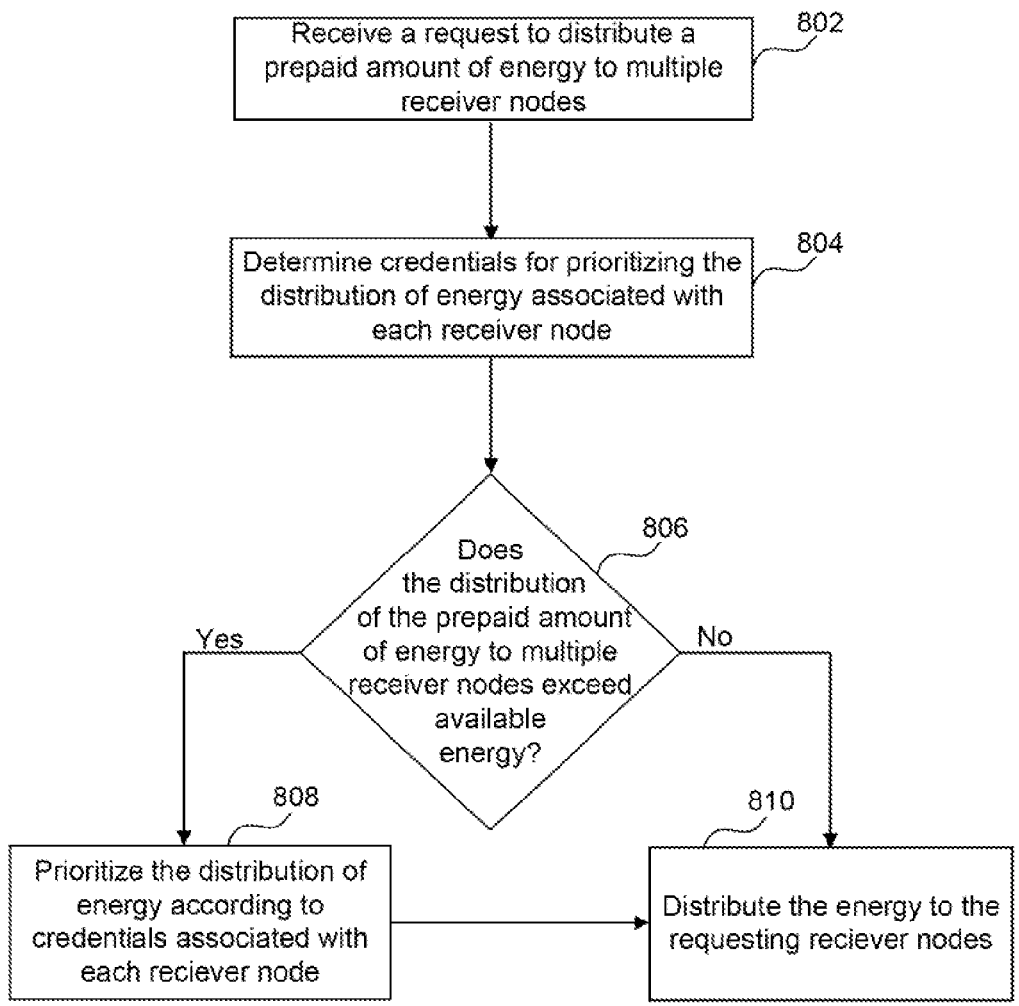
FIG. 8 is a flowchart of a method for prioritizing the receipt of a prepaid amount of energy, according to an embodiment.

FIG. 8 is a flowchart 800 of a method for prioritizing the receipt of a prepaid amount of energy, according to an embodiment.

At stage 802, a request to distribute a prepaid amount of energy is received. As described herein, source node 116 in energy distribution system 104 receives a request to distribute a prepaid amount of energy to receiver node 126.

At stage 804, credentials of the receiver node are analyzed. As described herein, credentials of the receiver node 126 may be analyzed within energy distribution system 104 or within energy management system 110. Credentials may include the priority of receiver node 126 to receive the prepaid amount of energy. Credentials may be linked to receiver ID 130 that is associated with receiver node 126. For example, energy receiver 106 that bought or received receiver node 126 may have chosen to pay a premium for energy in order to have a priority for receiving energy from energy distribution system 104. In another example, energy receiver 106 may have chosen to pay less for energy, but have a lower priority to receive energy from energy distribution system 104 in the event demand for energy exceeds supply. In another embodiment, energy provider 114 may configure receiver nodes 126 that are used by energy provider 114 to have a higher priority for receiving energy than other receiver nodes 126.

At stage 806, a determination is made of whether the demand for the prepaid amount of energy exceeds the supply of the energy produced by energy distribution system. When demand for energy exceeds the supply, flowchart proceeds to stage 808. Otherwise, flowchart proceeds to stage 810.

At stage 808, a prioritization process occurs. For example, when multiple receiver nodes 126 request a limited supply of energy from energy distribution system 104, source node 116 uses credentials 142 of each receiver node 126 that were obtained in stage 804 to determine the order for receiver nodes 126 to receive energy. For example, source node 116 may use credentials 142 to determine which smart meters 120 receive a signal to open energy switches 202. In this case, energy receivers 106 that paid a premium price for energy may receiver energy sooner than other energy receivers 106.

At stage 810, a distribution of energy occurs. When energy supply exceeds energy demand, source node 126 distributes energy to the requesting receiver nodes 126. However, when energy demand exceeds energy supply, source node 126 distributes energy based on credentials obtained in stage 808.

Figure 9:
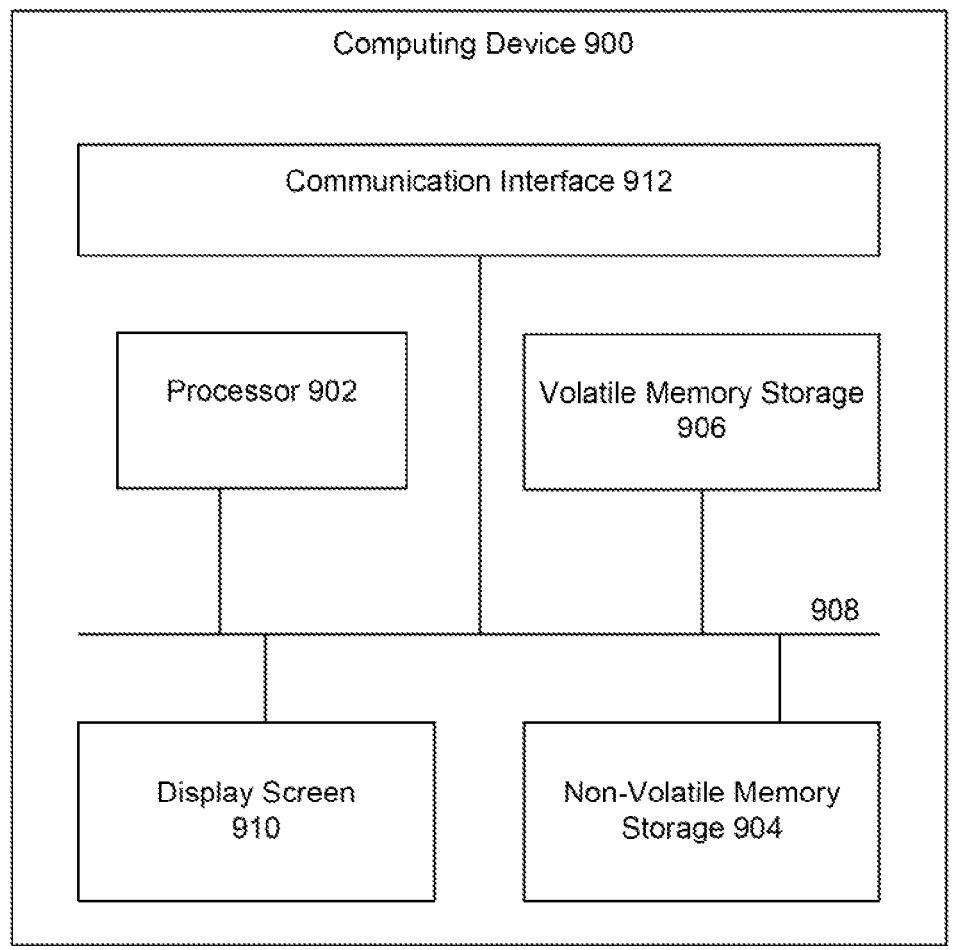
FIG. 9 is a block diagram of a computer system in which embodiments of the invention can be implemented.

FIG. 9 is an example computer system 900 in which embodiments of the present invention, or portions thereof, may be implemented as computer-readable code. For example, the components or modules included in computing devices of self-organizing energy grid and payment system 100, such as energy management system 108 and payment processing system 110, modules within source node 116, etc., may be implemented in one or more computer systems 900 using hardware, software, firmware, tangible computer-readable media having instructions stored thereon, or a combination thereof and may be implemented in one or more computer systems or other processing systems. Modules and components in FIGS. 1-8 may be embodied in hardware, software, or any combination thereof.

Computing device 138, payment processing system 110 and energy management system 108 may include one or more computing devices that include a computer system 900. Computer system 900 may include one or more processors 902, one or more non-volatile storage mediums 904, one or more memory devices 906, a communication infrastructure 908, a display screen 910 and a communication interface 912.

Processors 902 may include any conventional or special purpose processor, including, but not limited to, digital signal processor (DSP), field programmable gate array (FPGA), and application specific integrated circuit (ASIC).

Non-volatile storage 904 may include one or more of a hard disk drive, flash memory, and like devices that may store computer program instructions and data on computer-readable media. One or more of non-volatile storage device 804 may be a removable storage device.

Memory devices 906 may include one or more volatile memory devices such as but not limited to, random access memory. Communication infrastructure 908 may include one or more device interconnection buses such as Ethernet, Peripheral Component Interconnect (PCI), and the like.

Typically, computer instructions are executed using one or more processors 902 and can be stored in non-volatile storage medium 904 or memory devices 906. Computer instructions may be stored on computing devices in self-organizing energy grid and payment system 100 in a compiled file, an executable file or dynamically linked libraries or objects. Computer instructions may also be compiled on components in system 900 prior to execution. Computer instructions may also be included in a routine, a subroutine, or layers of a software stack that are manipulated by processors 902.

Display screen 910 allows results of the computer operations to be displayed to a user or an application developer.

Communication interface 912 allows software and data to be transferred between computer system 900 and external devices. Communication interface 912 may include a modem, a network interface (such as an Ethernet card), a communications port, a PCMCIA slot and card, or the like. Software and data transferred via communication interface 912 may be in the form of signals, which may be electronic, electromagnetic, optical, or other signals capable of being received by communication interface 912. These signals may be provided to communication interface 912 via a communications path. The communications path carries signals and may be implemented using wire or cable, fiber optics, a phone line, a cellular phone link, an RF link or other communications channels.

Embodiments also may be directed to computer program products comprising software stored on any computer-useable medium. Such software, when executed in one or more data processing device, causes a data processing device(s) to operate as described herein. Embodiments of the invention employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A system configured to provide a prepaid amount of energy, comprising:
   a processor;
   a memory coupled to the processor; and
   a source node in a self-organizing electric grid and including components stored in the memory and executing on the processor and configured to:
      receive a message authorizing a disbursement of the prepaid amount of energy to a receiver node in the self-organizing electric grid, wherein a payment for the prepaid amount of energy was made using a receiver node identifier associated with the receiver node that receives the prepaid amount of energy;
      receive input voltage from a power source in the self-organizing electric grid, wherein duration that the input voltage is received corresponds to the payment made for the prepaid amount of energy;
      transform the input voltage provided by the power source into a micro-grid voltage; and
      distribute the micro-grid voltage to the receiver node associated with the receiver node identifier that was used to make the payment for energy, wherein the micro-grid voltage is distributed using a point-to-point wiring between the source node and the receiver node, and wherein the receiver node acts as a second source node to another receiver node.

2. The system of claim 1, wherein the source node is further configured to control the distribution of the input voltage from the power source.

3. The system of claim 2, wherein the source node is further configured to terminate the distribution of the input voltage from the power source when the prepaid amount of energy is received by the receiver node from the power source.

4. The system of claim 1, wherein the receiver node is configured to transform the grid voltage into an appliance voltage, wherein the appliance voltage is used by an electric appliance.

5. The system of claim 1, wherein the source node further comprises a direct current (DC) converter configured to convert the input voltage into a DC micro-grid voltage.

6. The system of claim 1, wherein the source node further comprises a wireless communication interface configured to receive the message authorizing the disbursement of the prepaid amount of energy.

7. The system of claim 1, wherein the power source is owned by a party other than an energy receiver.

8. The system of claim 1, further comprising energy storage configured to:
   store energy from the power source; and
   distribute the prepaid amount of energy in response to the payment in place of the power source.

9. The system of claim 1, wherein the source node is further configured to prioritize the distribution of the micro-grid voltage to a plurality of the receiver nodes, when each receiver node in the plurality of the receiver nodes requests a respective prepaid amount of energy.

10. The system of claim 9, wherein the source node is further configure to terminate the distribution of the micro-grid voltage to each receiver node in the plurality of receiver nodes based on the priority of each receiver node.

11. The system of claim 1, wherein the message is an SMS message received from an energy management system, the energy management system including price information associated with the power source.

12. The system of claim 1, wherein the source node further comprises a smart meter configured to measure the amount of input voltage distributed to the receiver node.

13. The system of claim 1, further comprising the receiver node coupled to the source node using the point-to-point wiring and the receiver node further configured to:
   receive the prepaid amount of energy from the source node, wherein the prepaid amount of energy is transmitted as the micro-grid voltage;
   transform the micro-grid voltage into an appliance usable voltage, wherein the appliance usable voltage provides energy to an electric appliance; and
   provide the appliance usable voltage to an electrical outlet, until the prepaid amount of energy is used up by the electric appliance.

14. The system of claim 13, further comprising an energy meter coupled to the receiver node and configured to indicate an unused amount of energy from the prepaid amount of energy that can be used by the electric appliance.

15. The system of claim 11, wherein the receiver node includes the receiver node identifier, the receiver node identifier identifying the receiver node in the payment for energy that results in energy being distributed to the receiver node.

16. A method for providing a discrete amount of energy, comprising:
   receiving, by an energy management system, a request for a prepaid amount of energy, wherein the request includes a receiver node identifier associated with a receiver node in a self-organizing electric grid that receives the prepaid amount of energy;
   querying pricing information associated with a power source of the self-organizing electric grid that provides energy to the receiver node;

transmitting a payment request to a payment processing system to process a payment for the prepaid amount of energy;
receiving, by the energy management system, an authentication from the payment processing system that the payment was processed; and
transmitting, by the energy management system, a request to disperse the prepaid amount of energy to a source node in the self-organizing electric grid, wherein the prepaid amount of energy is associated with a payment amount and wherein the request to disperse the prepaid amount of energy causes the source node to receive an input voltage from the power source and transmit the input voltage as a micro-grid voltage to the receiver node in a point-to-point wiring, wherein the receiver node acts as a second source node to another receiver node.

17. The method of claim 16, further comprising:
querying a credential associated with the receiver node; and
determining, based on the credential a priority of the receiver node for receiving the prepaid amount of energy.

18. The method of claim 16, further comprising:
transmitting a message that includes the prepaid amount of energy that was purchased.

19. The method of claim 16, further comprising:
transmitting a message to terminate the disbursement of the prepaid amount of energy.

20. The method of claim 16, further comprising:
transmitting a message that includes the receiver node identifier associated with the receiver node that receives the prepaid amount of energy.

21. The method of claim 16, further comprising:
receiving a message that includes the amount of energy that was distributed to the receiver node.

22. A computer-implemented method for providing a prepaid amount of energy, comprising:
receiving a message authorizing a disbursement of the prepaid amount of energy to a receiver node in a self-organizing electric grid, wherein a payment for the prepaid amount of energy was made using a receiver node identifier associated with the receiver node in the self-organizing electric grid that receives the prepaid amount of energy;
receiving input voltage from a power source in the self-organizing electric grid connected to a source node, wherein the duration the input voltage is received corresponds to a payment made for the prepaid amount of energy;
transforming the input voltage provided by the power source into a micro-grid voltage; and
distributing the micro-grid voltage to the receiver node associated with the receiver node identifier that was used to make the payment for energy, and wherein the micro-grid voltage is distributed using a point-to-point wiring between a source node and the receiver node, and wherein the receiver node acts as a second source node to another receiver node.

23. The computer-implemented method of claim 22, further comprising:
receiving the prepaid amount of energy from the source node, wherein the prepaid amount of energy is transmitted as the micro-grid voltage using point-to-point wiring;
transforming the micro-grid voltage into an appliance usable voltage, wherein the appliance usable voltage provides energy to an electric appliance; and
providing the appliance usable voltage to an electrical outlet, until the prepaid amount of energy is used up by the electric appliance.

* * * * *